R. H. SCHEIBERT.
STEERING WHEEL.
APPLICATION FILED OCT. 16, 1913.
1,103,438.
Patented July 14, 1914.
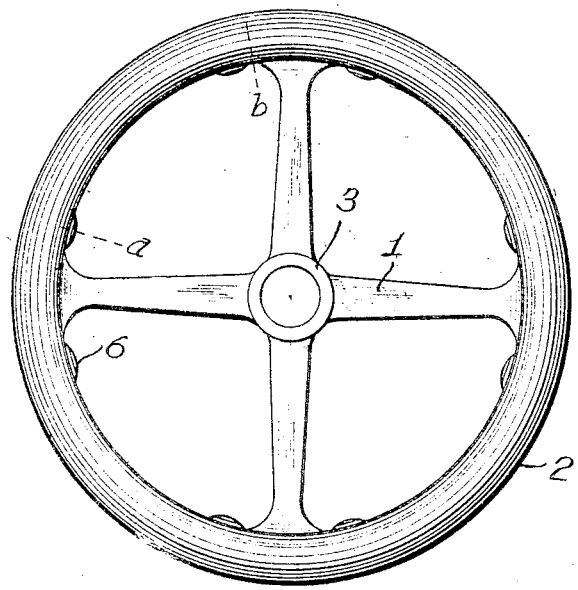
Fig.1
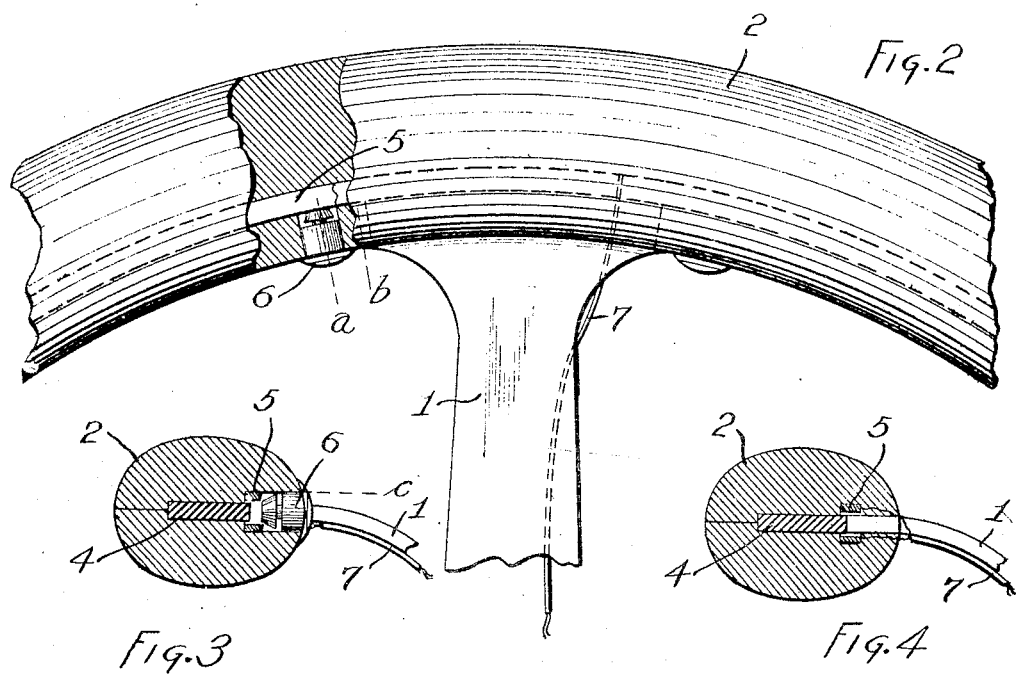
Fig.2
Fig.3
Fig.4
Witnesses:
Geo. Johnson.
M. S. Belden.
Rudolph H. Scheibert
Inventor
by James W. See
Attorney

UNITED STATES PATENT OFFICE.

RUDOLPH H. SCHEIBERT, OF CINCINNATI, OHIO.

STEERING-WHEEL.

1,103,438.　　　Specification of Letters Patent.　　　Patented July 14, 1914.

Application filed October 18, 1913. Serial No. 795,838.

*To all whom it may concern:*

Be it known that I, RUDOLPH H. SCHEIBERT, a citizen of the United States, residing at Springdale, Cincinnati, Hamilton county, Ohio, have invented certain new and useful Improvements in Steering-Wheels, of which the following is a specification.

The steering-wheel of an automobile is often provided with an electrical push-button controlling a circuit for operating a signal device or for operating other devices. While the operator has both hands on the steering-wheel no serious trouble is found in reaching the push-button with sufficient quickness, but if it happens that one of the operator's hands is removed from the steering-wheel in order to handle controlling levers and the steering-wheel be turned through a considerable angle as the automobile makes a turn, the push-button may have reached a position inaccessible to the operator's single hand on the steering-wheel. My improvement in steering-wheels overcomes the difficulty mentioned and the improvement will be readily understood from the following description taken in connection with the accompanying drawing in which:—

Figure 1 is a plan of a steering-wheel exemplifying my invention: Fig. 2 a plan of a portion of the rim of the wheel, part vertical section, in the plane of line *c* of Fig. 3: Fig. 3 a vertical transverse section of the rim of a wheel in the plane of line *a* of Figs. 1 and 2: and Fig. 4 a vertical transverse section of the rim of the wheel in the plane of line *b* of Figs. 1 and 2.

In the drawing:—1, indicates the arms of the wheel: 2, the wooden rim, of usual construction: 3, the hub: 4, the metallic rim usually embedded between the upper and lower plies of the wooden rim and formed integrally with the arms, as usual: 5, a pair of metallic rings embedded within the wooden rim but separated from each other: 6, a circumferential series of push-buttons disposed around the interior of the rim, one button at each side of each of the arms, these push-buttons being adapted to place the two rings 5 in electrical connection with each other: and 7, electrical conductors leading from rings 5 inwardly toward the center of the wheel and adapted to be connected with conductors leading to any electrical translating device to be controlled by the push-buttons.

Whatever may be the angular condition of the wheel, and regardless of whether the operator has one or both hands upon the wheel, one of the push-buttons can always be reached without any material shifting of the operator's hand or hands upon the wheel.

I claim:—

1. A steering-wheel comprising, a rim, arms supporting said rim, a pair of electrical conductors carried by the rim of the wheel and forming portions of a single electric circuit, and a circumferential series of push-buttons carried by the rim and adapted individually to place said conductors in electrical communication with each other and close the common electric circuit formed by said pair of conductors, combined substantially as set forth.

2. A steering-wheel comprising, a rim, arms supporting said rim, a pair of electrical conductors carried by the rim of the wheel and forming portions of a single electric circuit, and a circumferential series of push-buttons disposed upon the interior surface of the rim and adapted individually to place said conductors in electrical communication with each other and close the common electric circuit formed by said pair of conductors, combined substantially as set forth.

3. A steering-wheel comprising a rim, arms supporting said rim, a pair of metallic rings embedded within the rim but separated from each other and forming portions of a single electric circuit, electrical conductors connected with said rings, and a circumferential series of push-buttons carried by the rim and adapted individually to place said conductors in electrical communication with each other and close the common electric circuit formed by said pair of rings, combined substantially as set forth.

4. A steering-wheel comprising a rim, arms, a pair of electrical conductors carried by the rim of the wheel and forming portions of a single electric circuit, and a circumferential series of push-buttons carried by the rim and disposed one at each side of each of the arms, and adapted individually to place said conductors in electrical communication with each other and close the common electric circuit formed by said pair of conductors, combined substantially as set forth.

RUDOLPH H. SCHEIBERT.

Witnesses:
A. J. ZANONE,
G. B. JOLLY.